US012774211B2

(12) United States Patent
Carlsson

(10) Patent No.: US 12,774,211 B2
(45) Date of Patent: Oct. 27, 2026

(54) GRAPHENE SEPARATION

(71) Applicant: Bright Day Graphene AB, Kista (SE)

(72) Inventor: Anna Carlsson, Kista (SE)

(73) Assignee: Bright Day Graphene AB, Kista (SE)

( * ) Notice: Subject to any disclaimer, the term of this patent is extended or adjusted under 35 U.S.C. 154(b) by 491 days.

(21) Appl. No.: 18/284,439

(22) PCT Filed: Mar. 30, 2022

(86) PCT No.: PCT/EP2022/058469

§ 371 (c)(1),
(2) Date: Sep. 27, 2023

(87) PCT Pub. No.: WO2022/207739

PCT Pub. Date: Oct. 6, 2022

(65) Prior Publication Data

US 2024/0158237 A1 May 16, 2024

(30) Foreign Application Priority Data

Mar. 31, 2021 (EP) .................................... 21166333

(51) Int. Cl.
*C01B 32/198* (2017.01)
*C01B 32/19* (2017.01)

(52) U.S. Cl.
CPC ............ *C01B 32/198* (2017.08); *C01B 32/19* (2017.08); *C01B 2204/32* (2013.01); *C01P 2004/03* (2013.01); *C01P 2004/22* (2013.01)

(58) Field of Classification Search
CPC ... C01B 32/198; C01B 32/19; C01B 2204/32; C01P 2004/03; C01P 2004/22
See application file for complete search history.

(56) References Cited

U.S. PATENT DOCUMENTS

2009/0087800 A1 4/2009 Nakahira et al.
2019/0283378 A1* 9/2019 Lin ........................ B32B 15/08
(Continued)

FOREIGN PATENT DOCUMENTS

CN 103879991 A 6/2014
WO WO-2020081409 A1 * 4/2020 ............ H01M 4/386

OTHER PUBLICATIONS

D. Geng et al: "From the Cover: Uniform hexagonal graphene flakes and films grown on liquid copper surface", Proceedings of the National Academy of Sciences ,vol. 109, No. 21, May 22, 2012.
(Continued)

*Primary Examiner* — Wayne A Langel
(74) *Attorney, Agent, or Firm* — Flaster Greenberg PC

(57) ABSTRACT

The present invention relates to a method of producing graphene and/or graphene oxide. The method comprises providing a copper-based sheet coated on one side with a carbonaceous material; providing a bath comprising an aqueous solution comprising a salt of at least one ion selected from $Li^+$, $Na^+$, K+, $Mg^{2+}$ or $Ca^{2+}$, in which bath a first electrode is arranged; feeding the copper-based sheet into the bath; applying a first voltage between the copper-based sheet and the first electrode; applying a second voltage, reversed as compared to the first voltage, between the copper-based sheet and the first electrode, such that graphene and/or graphene oxide is exfoliated from the carbonaceous material. The present invention also relates to a system for producing graphene and/or graphene oxide. The present invention also relates to a graphene material formed as crystalline, self-supporting hexagonal flakes. The present invention also relates to a graphene material formed as crystalline, self-supporting flakes comprising dendrites.

12 Claims, 6 Drawing Sheets

(56) References Cited

U.S. PATENT DOCUMENTS

| | | | | |
|---|---|---|---|---|
| 2019/0284712 | A1* | 9/2019 | Lin | C01B 32/198 |
| 2019/0292675 | A1* | 9/2019 | Lin | C08J 7/043 |
| 2021/0061663 | A1 | 3/2021 | Carlsson | |

OTHER PUBLICATIONS

C.T.J. Low et al: "Electrochemical approaches to the production of graphene flakes and their potential applications", Carbon, vol. 54, Nov. 21, 2012.

Liu, et al., "Synthesis of graphene materials by electrochemical exfoliation: Recent progress and future potential", Carbon Energy, vol. 1, 2019, pp. 173-199.

Shuili, et al., "Surface Modification of Powder (4th Edition)", China Building Material Industry Press, Jun. 2019, 5 pages.

* cited by examiner

GRAPHENE SEPARATION

CROSS-REFERENCE TO RELATED APPLICATIONS

This application is the 371 National Stage of International Application No. PCT/EP2022/058469, filed Mar. 30, 2022, which claims priority to European Application No. 21166333.1, filed Mar. 31, 2021, the disclosures of which are incorporated herein by reference in their entireties.

TECHNICAL FIELD

The present invention relates to a method for producing graphene and/or graphene oxide, to a system for producing graphene and/or graphene oxide, and to a graphene material formed as self-supporting crystalline flakes.

BACKGROUND

Two-dimensional materials, and in particular graphene, has sparked a vast interest since first being synthesized in the early 21$^{st}$ century, owing primarily to their mechanical, electronic, and optical properties. The use of graphene materials in various applications has increased steadily since its discovery. Several methods for the manufacture of graphene have been proposed, including chemical vapor deposition (CVD) and exfoliation.

Graphene or graphene composites can be produced on metal substrates, such as copper substrates. WO 2019/180227 A1 discloses a method for producing a carbon composite material comprising a graphene film arranged on an amorphous carbon substrate on a metal surface, such as a copper surface. WO 2019/180227 A1 discloses that flakes of the composite material can be removed from the copper substrate by, for example, dissolution of the copper using a strong acid, or by electro-delamination. The disclosed electro-delamination involved using the copper as a first electrode, a graphite electrode as a second electrode and a solution of 0.05 M NaOH as electrolyte followed by the application of a current of 25 mA/cm$^2$ to the electrodes. The copper electrode was thereafter transferred to a container of MilliQ water which removed flakes of the composite material.

However, there is a need in the art today for methods for producing pure and crystalline graphene and/or graphene oxide from carbonaceous material provided on copper substrates, preferably in a manner which does not consume the copper substrate.

SUMMARY

An object of the invention is to at least alleviate some of the problems associated with the prior art. In particular, an object of the invention is to provide an improved method for producing pure and crystalline graphene and/or graphene oxide from a carbonaceous material deposited on a metal substrate, preferably a copper substrate. It is an object of provide a method for producing graphene and/or graphene oxide that does not consume the metal substrate, and which provides pure flakes of crystalline graphene and/or graphene oxide. These and other objects are accomplished by a method of producing graphene and/or graphene oxide comprising the steps of:

providing a copper-based sheet coated on at least one side with a carbonaceous material;

providing a bath comprising an aqueous solution comprising a salt of at least one ion selected from $Li^+$, $Na^+$, $K^+$, $Mg^{2+}$ or $Ca^{2+}$, in which bath a first electrode is arranged;

feeding the copper-based sheet into the bath;

applying a first voltage between the copper-based sheet and the first electrode, such that the at least one ion is intercalated into the carbonaceous material;

applying a second voltage, reversed as compared to the first voltage, between the copper-based sheet and the first electrode, such that graphene and/or graphene oxide is exfoliated from the carbonaceous material.

According to one aspect of the inventive concept, there is provided a method of producing graphene and/or graphene oxide comprising the steps of:

providing a copper-based sheet coated on at least one side with a carbonaceous material;

providing a bath comprising an aqueous solution comprising a salt of at least one ion selected from Li+, Na+, K+, Mg2+ or Ca2+, in which bath a first electrode is arranged;

feeding the copper-based sheet into the bath;

applying a first voltage between the copper-based sheet and the first electrode, thereby intercalating the at least one ion into the carbonaceous material;

applying a second voltage, reversed as compared to the first voltage, between the copper-based sheet and the first electrode, thereby exfoliating graphene and/or graphene oxide from the carbonaceous material.

The method for producing graphene and/or graphene oxide is advantageous in that it provides a method for producing pure, crystalline high quality graphene and/or graphene oxide in a manner which does not consume the copper sheet.

The present invention is based on the realization that a graphene and/or graphene oxide can be produced by a method which involves the intercalation of large alkali or alkali metal ions into a carbonaceous material provided on a copper substrate. The intercalation of ions is alleviated by the fact that a voltage is applied between the copper substrate and an electrode, which causes the positive ions to travel towards the copper-based sheet and to be intercalated between graphene sheets in the carbonaceous material. The intercalation extends the distance between graphene sheets in the carbonaceous material, thereby weaking the forces holding the material together. When the voltage between the copper substrate and the electrode is reversed, the intercalated ions will travel from their intercalated positions in the carbonaceous material, which causes graphene and/or graphene oxide to be removed by exfoliation from the carbonaceous material.

The inventive method is performed by feeding a copper-based sheet coated on at least one side, such as on both sides, with a carbonaceous material into a bath comprising an aqueous solution comprising a salt of at least one ion selected from $Li^+$, $Na^+$, $K^+$, $Mg^{2+}$ or $Ca^{2+}$. The bath should preferably be void of any solutions which would dissolve or otherwise damage the copper-based substrate, such as void of strong acids. Thus, a method which removes graphene and/or graphene oxide from a carbonaceous material deposited on a copper-based sheet without consuming the copper-based sheet can be obtained.

The copper based sheet is preferably fed through the bath by a feeding device configured to feed the copper-based sheet into the bath for the two-step process of intercalation and exfoliation. The feeding device then removes the copper-based sheet from the bath after the two step process. This may for example be accomplished in a manner similar to how a continuous paper web travels in a paper machine. The copper based sheet is attached between a first roller and a second roller. The copper-based sheet is arranged to travel through the bath by a set of supporting guide rollers provided in the bath. Thus, a continuous process can be achieved in which new portions of the copper-based sheet are continuously fed into the bath by the first roller and the second roller, subjected to the two-step process, and removed from the bath by the rollers. At the same time, a new portion of the copper-based sheet is fed into the bath. This process can preferably be continuous for the length of the copper-based sheet.

The two-step process of intercalation and exfoliation is performed by providing a first voltage between the electrode provided in the bath and the copper sheet. This voltage can be obtained by providing the copper-based sheet in contact with an electrode, such as an inert electrode, such as a platinum electrode. A voltage controlling means can then be utilized to apply the first voltage between the copper-based sheet and a counter electrode in the bath. Since the ions to be intercalated have a positive charge, the first voltage is selected such that the copper based-sheet attracts the positive ions, thereby alleviating the intercalation of the positive ions into the carbonaceous material. After the intercalation, the voltage is reversed compared to the first voltage, such that the intercalated ions are attracted by the counter electrode, which alleviates the exfoliation of graphene and/or graphene oxide from the carbonaceous material. The graphene and/or graphene oxide removed from the carbonaceous material has been found to be pure and highly crystalline.

The first voltage may be in the range of −8 V to −2 V, such as in the range of −6 V to −2 V. The first voltage may be applied for a period of at least 0.5 seconds, such as for a period of at least 1 second such as for a period of 1 second to 5 seconds.

Alternatively, the first voltage may be in the range of −30 V to −2 V, such as in the range of −12 V to −2 V, such as in the range of −10 to −2 V, such as in the range of −8 V to −2 V, such as in the range of −6 V to −2 V. Alternatively, the first voltage may be −2 V or lower.

The second voltage may be in the range of +2 V to +12 V, such as in the range +2V to +8 V, such as in the range +2 V to +8 V. The second voltage may be applied for a period less than 0.15 seconds, such as of less than 0.1 seconds. Preferably, the second voltage is applied for a shorter time than the first voltage in order not to risk oxidation of the copper.

Alternatively, the second voltage may be in the range of +0.3 V to +12 V, such as in the range of +0.5 V to +12 V, such as in the range of +2 V to +12 V, such as in the range +2V to +10 V, such as in the range +2 V to +8 V. Alternatively, the second voltage may be +0.3 V or higher.

The inventors have realized that the upper limit of +12 V for the second voltage may be adequate when using a copper-based sheet. Furthermore, it has been realized that the lower limit for the first voltage (i.e. the negative voltage with largest absolute value) should preferably be selected with one or more setup parameters in mind, such as thickness and capacity of leads connected to the voltage controlling means (e.g. to avoid melting the leads), the volume of aqueous solution, and salt concentration. It has been realized that under some circumstances it may be possible to perform the method according to the inventive concept with a first voltage being lower than −30 V.

Furthermore, it is to be understood that the lower and upper limits of the disclosed ranges of the first voltage may be combined to form ranges not explicitly formulated in the present disclosure. Similarly, it is to be understood that the lower and upper limits of the disclosed ranges of the second voltage may be combined to form ranges not explicitly formulated in the present disclosure.

Voltage controlling means are preferably configured accordingly to provide the voltages disclosed above.

The two-step process of intercalation and exfoliation may be performed several times during the travel of a copper-based sheet in the bath, such that the same carbonaceous material is subjected to a voltage sequence starting with the first voltage, followed by the second voltage, followed by the first voltage, followed by the second voltage. This process may be repeated continuously until the graphene and/or graphene oxide has been satisfactorily removed from the copper-based sheet.

Herein, the term “graphene” refers to the two-dimensional carbon material known to the skilled person in the art. The term is also intended to denote so called “few layer graphene”, which is intended to denote a material comprising a stack of 2-10 graphene layers.

Herein, the term “graphene oxide” refers to an oxidized graphene known to the person skilled in the art, i.e. a two dimensional carbon material that has been oxidized. It is also intended to denote few layer graphene which is oxidized.

Herein, the term “copper-based sheet” is intended to denote a sheet of copper metal or a copper alloy. The copper-based sheet may be provided as a foil. The sheet is preferably thin enough such that the copper based-sheet could be rolled around a roller comprised in the feeding device of the present disclosure. The sheet may preferably have a thickness which is much smaller than the width of the sheet. The width should preferably be much smaller than the length of the sheet.

The term “coated on one side” refers to that on at least one side of the copper-based sheet, there is provided a carbonaceous material. The coating need not cover the sheet completely. The coating may also be provided on both sides of the copper-based sheet.

The term “carbonaceous material” refers to a carbon material from which graphene can be exfoliated by the present invention. The carbonaceous material of the present material may comprise bonded graphene and/or graphene oxide material. The carbonaceous material may comprise graphite, which comprises sheets of graphene bonded in a stack. The carbonaceous material may alternatively, or additionally, comprise a carbon composite material comprising graphite, graphene film arranged on a graphite substrate, and/or a graphene film arranged on an amorphous carbon substrate. The carbonaceous material may comprise graphite, a graphene film arranged on a graphite substrate, and/or a graphene film arranged on an amorphous carbon substrate. In the inventive process, the bonded graphene in the carbonaceous material is removed by the intercalation/exfoliation process. The carbonaceous material may comprise at least 80% carbon by weight, such as at least 90% carbon by weight, such as at least 95% carbon by weight, such as essentially consist of carbon by weight. The present invention thus provides a method for separating graphene and/or graphene oxide from a carbonaceous material provided on a copper-based sheet. In principle, by repeating the intercalation/exfoliation, one layer of graphene and/or graphene oxide can be exfoliated per intercalation/exfoliation cycle.

The method of the inventive concept may thus be considered advantageously flexible in that graphene and/or graphene oxide may be produced from a plurality of different carbonaceous materials.

The term "aqueous solution comprising a salt of at least one ion selected from $Li^+$, $Na^+$, $K^+$, $Mg^{2+}$ or $Ca^{2+}$" refers to a composition formed by provision of a salt comprising $Li^+$, $Na^+$, $K^+$, $Mg^{2+}$ or $Ca^{2+}$ to water or to a solution comprising a majority portion of water. Herein, the aqueous solution may be void of strong acids such as HCl, $H_2SO_4$ and $HNO_3$. It may also be void of other compositions known to deteriorate copper. Preferably, the aqueous solution comprises $Ca^{2+}$ or $Na^+$. It is contemplated that larger ions, during intercalation, provides an increased separation between adjacent graphene sheet in the carbonaceous material, thereby alleviating the exfoliation. The concentration of the ions in the bath may be at least 0.001 M, in the range of 0.001-0.1 M, such as in the range of 0.001-0.01 M, such as in the range of 0.002M to 0.006 M.

The "first electrode" may refer to an inert electrode, such as a platinum electrode. The first electrode may be arranged as a roller positioned in the bath and arranged to guide the copper-sheet during its travel through the bath. As such, a good conductive contact can be provided between the electrode and the copper based sheet such that a voltage can be provided between them.

There may be at least one counter-electrode provided in the bath.

In some embodiments, the carbonaceous material comprises a graphene film arranged on an amorphous carbon substrate.

WO 2019/180227 A1 discloses a method for producing a composite material comprising a graphene film arranged on an amorphous carbon substrate on a metal surface, such as a copper surface. The method disclosed herein may be provided to produce graphene and/or graphene oxide flakes from the composite material in an improved manner that provides a high yield of graphene and/or graphene oxide without consuming the copper-based sheet.

The carbonaceous material may be obtainable from bio-oil, and/or from a lignin source, such as from a lignin source comprising refined lignin, purified lignin, alkali lignin and lignosulfonate.

The term "bio-oil", sometimes referred to as pyrolysis oil, tar or biocrude, refers to an oil obtainable from for example raw materials such as rape seed, conifers, such as pine, fir trees and spruce, and microalgae lipids, or residual products thereof. The bio-oil may thus be considered a renewable resource which advantageously allows for an environmentally friendly method.

It is contemplated that during the application of the first voltage, ions provided in the bath are intercalated between the graphene film and the amorphous carbon substrate. When the second voltage is applied, graphene flakes, preferably having an average size of at least 1 $\mu m^2$, are exfoliated from the composite material. When the graphene film comprises few layer graphene, it is contemplated that the intercalation occurs also between the graphene layers in the few layers graphene.

The graphene may be exfoliated as flakes having an average size of at least 1 $\mu m^2$. The graphene oxide may be exfoliated as flakes having smaller size.

The inventors have surprisingly found that part of the exfoliated graphene may be formed as hexagonal flakes. The hexagonal flakes are contemplated to be indicative of a high purity crystalline graphene. Such flakes are advantageous in that they provide high conductivity making the flakes suitable for use in various electrical and electrochemical applications.

The inventors have further found that the part of the graphene may be formed flakes comprising dendrites. It is contemplated that the dendritic shape is a precursor to the hexagonal flakes.

In some examples, the method may further comprise the prior steps of providing a lignin source and an aqueous solution to form a composition; depositing the composition on a copper-based sheet; heating the composition on the copper based sheet to form the composite material on the copper-based sheet. The method may be performed using a heating temperature and other process conditions as described in WO2019/180227 A1, preferably a temperature of 500-1100° C. The reaction temperature may also be in the range of 600-1000° C., such as in the range of 700-900° C., preferably in the range of 750-850° C., more preferably in the range of 790-815° C., for example about 805° C. The reaction time, which corresponds to the time the composition on the copper-based sheet is exhibited to the reaction temperature is typically in less than 1 hour, such as less than 50 minutes, preferably in the range of 10-50 minutes, such as about 30 minutes or about 20 minutes.

In some examples, the method may further comprise the prior steps of providing a bio-oil; depositing the bio-oil on a copper-based sheet; heating the bio-oil on the copper based sheet to form a carbon composite material on the copper-based sheet. The method may be performed using a heating temperature and other process conditions as described in WO2019/180227 A1, preferably a temperature of 500-1100° C. The reaction temperature may also be in the range of 600-1000° C., such as in the range of 700-900° C., preferably in the range of 750-850° C., more preferably in the range of 790-815° C., for example about 805° C. The reaction time, which corresponds to the time the bio-oil on the copper-based sheet is exhibited to the reaction temperature is typically in less than 1 hour, such as less than 50 minutes, preferably in the range of 10-50 minutes, such as about 30 minutes or about 20 minutes.

The carbon composite material may comprise graphite, graphene film arranged on a graphite substrate, and/or a graphene film arranged on an amorphous carbon substrate.

The inventor has realised that, surprisingly, e.g., the inventive concept pertaining to graphene separation can be performed using any carbonaceous material. Preferably, the carbonaceous material comprises graphite, graphene film arranged on a graphite substrate, and/or a graphene film arranged on an amorphous carbon substrate.

Although the method steps discussed in page 8, lines 27-30—page 9, lines 1-10 utilizes lignin for the provision of a carbonaceous material, such as a carbon composite material, other alternatives are possible within the scope of the inventive concept, such as the use of a bio-oil for the provision of a carbonaceous material, such as a carbon composite material as disclosed for example in example 2.

In some embodiments the carbonaceous material comprises graphite. Graphite is a material which per definition comprises graphene sheet stacked and held together by interlayer forces, such as by weak van der Waals-bonds. The present method allows for the intercalation and exfoliation of the ions in the aqueous solution between the graphene layers in the graphite material. It has been realized that when the carbonaceous material comprises graphite, graphene and/or graphene oxide may be exfoliated in the form of flakes.

In some embodiments, the copper-based sheet is fed into the bath by a feeding device comprising a plurality of rollers. A first roller may be arranged at a first end of the bath, and the second roller at a second, opposite end of the bath. At least one of the first and second roller may be motorized, thereby capable of automatically feeding the copper-based sheet into and through the bath. The plurality of rollers may furthermore comprise at least one guide roller provided in the bath, configured to guide the copper-based sheet through the bath. The guide roller may be a passive roller.

In some embodiments, the first electrode is arranged as a roller in the plurality of rollers. The first electrode may be an inert electrode, such as noble metal electrode, preferably a platinum electrode. The electrode is preferably arranged in a guide roller. Thus, a good conductive contact can be obtained between the electrode and the copper-based sheet.

In some embodiments, the method further comprises the step of filtering the aqueous solution to collect the graphene and/or graphene oxide and to provide a filtered aqueous solution, optionally comprising copper ions. After the step of applying the second voltage, exfoliated graphene and or graphene oxide is present in the aqueous solution in the bath. The graphene and/graphene oxide may be separated from the aqueous solution in a filter, such as a filter press. The filter may be configured to separate the graphene and/or graphene oxide from other types carbonaceous residue in the aqueous solution, such as amorphous carbon.

The bath may comprise a liquid outlet for draining the liquid from the bath. The liquid outlet may be in liquid connection with a filter for performing the above-described filtering.

The steps of applying the first and second voltage may cause some of the copper to oxidise into $Cu^{2+}$. Consequently, $Cu^{2+}$ may be present in the aqueous solution.

In some embodiments, the method further comprises a step of cleaning the copper-based sheet using sonication. Sonication can be used to remove carbonaceous residue from the copper based sheet, after the graphene or graphene oxide has been separated.

In Some Embodiments the Method Further Comprises a Step of:

reducing the copper ions of the filtered aqueous solution on the copper-based sheet. In the event that any copper from the copper-based sheet has oxidised and is present as copper ions in the aqueous solution, a step of reducing the copper ions on the copper-based sheet may be performed. The copper-based sheet may previously have been cleaned to remove carbonaceous residue. This step is advantageous in that it minimizes the material consumption of the copper-based sheet.

In some embodiments, the method may further comprise a step of centrifuging the collected graphene and/or graphene oxide.

The obtained graphene and/or graphene oxide may be provided in the form of flakes, preferably having a size of at least 1 $\mu m^2$. By centrifuging, a sorting based on the size of the obtained graphene and/or graphene oxide can be obtained.

In some embodiments the salt comprises $Na^+$ and/or $Ca^{2+}$. Large ions are preferred, as they are deemed to expand the distance more between graphene layers in the carbonaceous material during the intercalation as compared to smaller ions. It is contemplated that this alleviates the exfoliation process, as the interlayer bonds in the carbonaceous material will be weaker.

In some embodiments, the pH in the bath is at least 6. It is advantageous if acid solutions are avoided in the bath, as acids may consume the copper-based sheet.

In some embodiments, the graphene and/or graphene oxide exfoliated from the carbonaceous material comprises crystalline, self-supporting hexagonal flakes having an average size of at least 1 $\mu m^2$.

The inventor has surprisingly found that the graphene and/or graphene oxide produced by the method is highly crystalline and pure. This is exemplified in that the graphene and/or graphene oxide may comprise crystalline, self-supporting hexagonal flakes having an average size of at least 1 $\mu m^2$. The term "self-supporting" denotes that the flakes are capable of supporting their own weight. The shape may be determined using microscopy, such as scanning electron microscopy.

The hexagonal flakes are produced in particular when the carbonaceous material comprises a graphene film arranged on an amorphous carbon substrate.

In some embodiments, the graphene and/or graphene oxide exfoliated from the carbonaceous material comprises crystalline, self-supporting flakes, preferably having an average size of at least 1 $\mu m^2$, the flakes having a plurality of dendrites. This may also be used as an indication that the produced graphene and/or graphene oxide is highly crystalline and pure. It is contemplated that the dendritic shape is a precursor to the hexagonal shape.

Preferably, the flakes with dendrites are formed of graphene.

Preferably, the hexagonal flakes are formed of graphene.

The objects of the invention are also accomplished by a system for producing graphene and/or graphene oxide comprising:

- a copper-based sheet coated on at least one side with a carbonaceous material;
- a bath comprising an aqueous solution comprising a salt of at least one ion selected from $Li^+$, $Na^+$, $K^+$, $Mg^{2+}$ or $Ca^{2+}$
- a feeding device for feeding the copper-based sheet into the bath;
- a first electrode configured to be arranged in the bath;
- a voltage controlling means configured to apply a first and a second voltage between the copper-based sheet and the first electrode, wherein the second voltage is reversed as compared to the first voltage.

The system as defined herein may be utilized to perform the method of the present disclosure. The inventor has found that the provision of a system as defined herein can be utilized to produce graphene and/or graphene oxide in an advantageous manner. It has been found that the system can be used to produce graphene and/or graphene oxide in a manner which does not consume the copper, and which produces highly pure and crystalline flakes of graphene and or graphene oxide.

The system is preferably arranged such that copper-based sheet coated on at least one side, such as both sides, with a carbonaceous material can be fed into the bath on a first side of the bath, travel through the bath, and to be removed from the bath at a second side of the bath. The second side is preferably arranged opposite the first side.

The voltage controlling means may be any device known to the skilled person in the art to be configured to apply a first and a second voltage between the copper-based sheet and the first electrode, wherein the second voltage is reversed as compared to the first voltage. The voltage controlling means may comprise a potentiostat. The voltage controlling means should preferably be configured to provide the first voltage and the second voltage in a pulsed sequence.

In some embodiments, the carbonaceous material of the system comprises graphite, a graphene film arranged on an amorphous carbon substrate, and/or a graphene film arranged on a graphite substrate. It has been realized that a copper-based sheet coated on one side with such carbonaceous materials are particularly advantageous in system of the inventive concept.

In some embodiments, the system further comprises a liquid removing means for removing the aqueous solution and the graphene and/or graphene oxide from the bath. The liquid removing means may be arranged on the bath. Preferably, the liquid removing means comprises an outlet and valve configured to open and close the outlet. When the valve is open, liquid can flow out of the bath. The liquid outlet may be in liquid connection with a filter, such that graphene and/or graphene oxide can be separated from the aqueous solution and or debris present in the aqueous solution.

The liquid removing means may also comprise a suction device configured to suck out the aqueous solution from the bath. The suction device may comprise a pump.

In some embodiments, the feeding device comprises at least one powered roller configured to feed the copper-based sheet and at least one passive roller configured to guide the copper-based sheet through the bath. The powered roller may be powered by a motor and configured to drive the metal based sheet into, through, and/or out of the bath. Preferably, the feeding device comprises a pair of powered rollers, arranged on opposing sides of the bath.

The passive roller is configured to guide the copper based-sheet through the bath. Passive rollers may be provided inside and outside of the bath.

In some embodiments, the passive roller is configured to be arranged in the bath comprise the first electrode. To provide a good contact between the copper based-sheet and the first electrode, is advantageous if the electrode is arranged in a passive roller provided in the bath. The first electrode is preferably an inert electrode, such as a noble metal electrode, such as a platinum electrode.

The objects of the invention are also accomplished by graphene material formed as crystalline, self-supporting hexagonal flakes having an average size of at least 1 $\mu m^2$. The inventors have surprisingly realized that a graphene material formed as crystalline, self-supporting hexagonal flakes having an average size of at least 1 $\mu m^2$ can be obtained by the method disclosed herein. In particular, the crystalline, self-supporting hexagonal flakes having an average size of at least 1 $\mu m^2$ can be obtained when the carbonaceous material comprises a graphene film arranged on an amorphous carbon substrate. The carbonaceous material comprising a graphene film arranged on an amorphous carbon substrate may preferably have been obtained from a lignin source and provided on the copper-based sheet by the method disclosed in WO 2019/180227 A1. As described herein, the carbonaceous material may have been obtained from a bio-oil source. When graphene and/or graphene oxide is removed from such carbonaceous material using the method of the present disclosure, a graphene material formed as crystalline, self-supporting hexagonal flakes having an average size of at least 1 $\mu m^2$ is formed. It is contemplated that the hexagonal shape is indicative of a highly pure and crystalline graphene with high conductivity and good mechanical properties, making it suitable for various electrical and electrochemical applications.

The shape of the flakes can be characterized using a scanning electron microscope. Raman spectroscopy may further be utilized to characterize graphene, for example by identification of a 2D peak.

The term "self-supporting" denotes that the flakes can support their own weight. The flakes are consequently not necessarily supported by any substrate, but can hold their shape. Expressed differently, "self-supporting" may be considered the property of withstanding the force of gravity without breaking. For example, a graphene flake which is capable of being suspended in the air without a supporting substrate, and does not break or crumble, may be considered self-supporting. A graphene flake which is suspended in water, and does not break or crumble, may be considered self-supporting. A graphene flake which is suspended in a solvent, and does not break or crumble, may be considered self-supporting. Thus, the term self-supporting may denote a flake which is held together and maintains structural integrity without being supported by, e.g., a supporting substrate.

In some embodiments, an area of the hexagonal flake is defined by six connected line segments, wherein adjoining line segments are connected at six vertices, and wherein the internal angle at each vertex is in the range of 110°–130°. The term "hexagonal shape" is defined herein as an area defined by six connected line segments, wherein adjoining line segments are connected at six vertices, and wherein the internal angle at each vertex is in the range of 110°-130°, preferably around 120°.

In some examples, the flakes may have an average size of at least 1 $\mu m^2$, such as in the range of 1 $\mu m^2$–50 $mm^2$, such as in the range of 1 $\mu m^2$–1 mm or in the range of 1 $mm^2$–50 $mm^2$. In general, graphene materials, and in particular graphene composite materials are produced as either nanoparticles or large sheets having an average size of at least 50 $mm^2$. The nanoparticles typically suffer from poor electronic conductivity, whereas large sheets are disadvantageous in bulk applications. The inventor has found that by providing flakes according to the present disclosure having an average size in the range of at least at least 1 $\mu m^2$, such as of 1 $\mu m^2$–50 $mm^2$, a composite material exhibiting a high conductivity can be achieved. Yet another advantage is that the flakes are suitable for use in bulk applications.

The objects of the invention are also accomplished by crystalline, self-supporting flakes having an average size of at least 1 $\mu m^2$, the flakes having a plurality of crystal dendrites.

The inventor has realised that crystalline, self-supporting flakes having an average size of at least 1 $\mu m^2$, the flakes having a plurality of crystal dendrites can be obtained by the method disclosed herein. In particular, the crystalline, self-supporting hexagonal flakes having an average size of at least 1 $\mu m^2$ can be obtained when the carbonaceous material comprises a graphene film arranged on an amorphous carbon substrate. The crystalline, self-supporting hexagonal flakes having an average size of at least 1 $\mu m^2$ may be obtained when the carbonaceous material comprises graphite, a graphene film arranged on a graphite substrate, and/or a graphene film arranged on an amorphous carbon substrate. The carbonaceous material comprising a graphene film arranged on an amorphous carbon substrate may preferably have been obtained from a lignin source and provided on the copper-based sheet by the method disclosed in WO 2019/180227 A1. When graphene and/or graphene oxide is removed from such carbonaceous material using the method of the present disclosure, a graphene material formed as crystalline, self-supporting hexagonal flakes having an average size of at least 1 μm$^2$ is formed. As described herein, the carbonaceous material may be obtained from a bio-oil source.

In some examples, the flakes may have an average size of at least 1 μm$^2$, such as in the range if 1 μm$^2$–50 mm$^2$, such as in the range of 1 μm$^2$–1 mm or in the range of 1 mm$^2$–50 mm$^2$. In general, graphene materials, and in particular graphene composite materials are produced as either nanoparticles or large sheets having an average size of at least 50 mm$^2$. The nanoparticles typically suffer from poor electronic conductivity, whereas large sheets are disadvantageous in bulk applications. The inventor has found that by providing flakes according to the present disclosure having an average size in the range of at least at least 1 μm$^2$, such as of 1 μm$^2$–50 mm$^2$, a composite material exhibiting a high conductivity can be achieved. Yet another advantage is that the flakes are suitable for use in bulk applications.

BRIEF DESCRIPTION OF THE DRAWINGS

The invention will be described with reference to the following figures, in which.

DETAILED DESCRIPTION

Figure 1A:
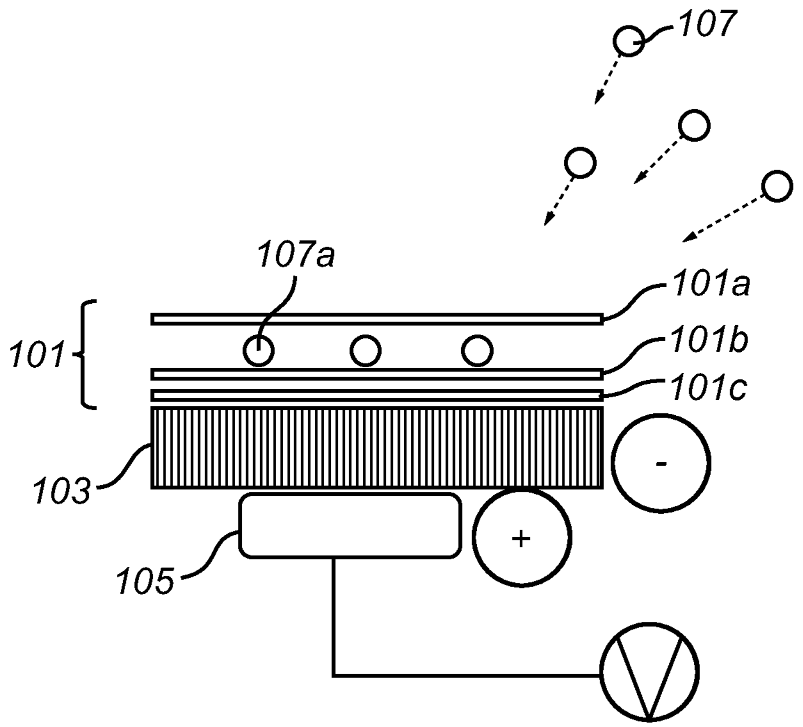
FIG. 1*a* is a schematic illustration of intercalation of ions into a carbonaceous material according to the present invention.
Figure 1B:
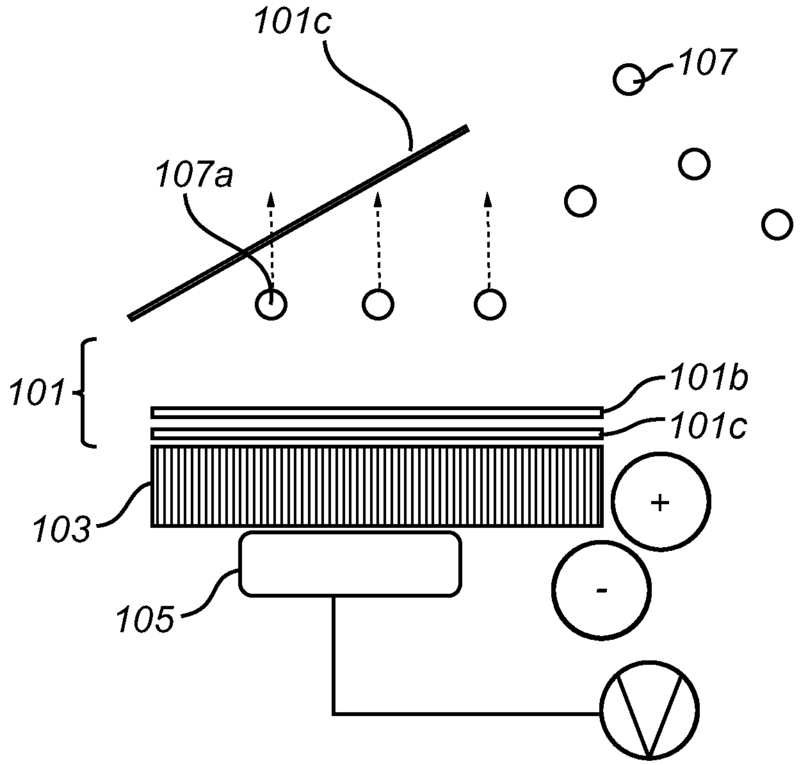
FIG. 1*b* is a schematic illustration of exfoliation of graphene and/or graphene oxide from the carbonaceous material according to the present invention.

FIGS. 1*a* and 1*b* show schematic illustrations useful for understanding the process for producing graphene and/or graphene oxide of the present invention. In FIG. 1, the step of applying a first voltage between the copper-based sheet and the first electrode, such that the at least one ion is intercalated into the carbonaceous material is schematically illustrated. FIG. 1*a* shows the carbonaceous material 101 deposited on a copper based sheet 103. The carbonaceous material is depicted herein as layers 101*a*-*b* of graphene held together by weak forces. When a voltage is provided between the copper material 103 and the first electrode 105, the ions 107 are attracted towards the copper material. Given that the ions are selected from $Li^+$, $Na^+$, $K^+$, $Mg^{2+}$ or $Ca^{2+}$, the first voltage is applied such that the copper-based sheet 103 is a negative electrode and the first electrode 105 a positive electrode. At least some of the ions may intercalate between the layers 101*a*-*c* and form intercalated ions 107*a*. The size of the ions will extend the distance between the graphene layers 101*a*-*c*, which weaken the bond between them.

FIG. 1*b* depicts the situation when the second voltage is applied. The second voltage is reversed as compared to the first voltage, making the copper based-sheet 103 a positive electrode and the first electrode 105 a negative electrode. Upon application of the second voltage, the intercalated ions 107 will be attracted by the first electrode 105. This will cause them to travel from the intercalated position. During said travel, the ions will alleviate the exfoliation of graphene and/or graphene oxide in the form of a flake 107*c* which is exfoliated from the carbonaceous material.

Figure 2:
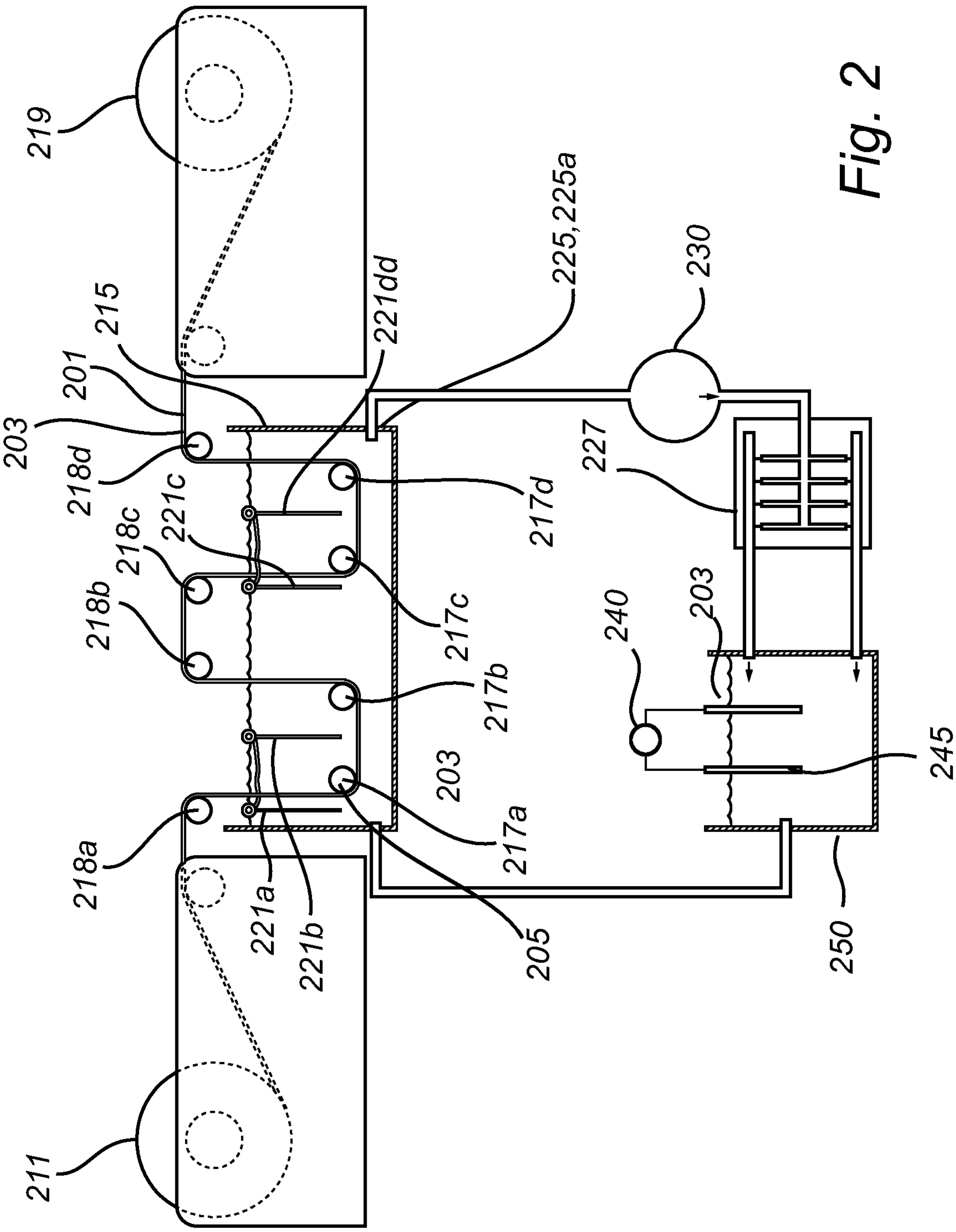
FIG. 2 is a schematic illustration of a system according to the invention.

FIG. 2 shows a schematic illustration of a system 200 producing graphene and/or graphene oxide. The system 200 is provided with a copper based sheet 203 coated with a carbonaceous material 201. The copper based sheet 203 is rolled onto a first roller 211 in a feeding device 213, guided through a bath 215 by a first set of passive guide rollers 217*a*-*d*, and rolled up on a second roller 219. The first and second rollers 211, 219 are preferably motorised such that the copper-based sheet can be fed into the bath 215, conveyed through the bath 215 by the first set of guide rollers 217*a*-*d* arranged in the bath and a second set of guide rollers 218*a*-*d* arranged above the surface of the aqueous solution in the bath, and taken out of the bath 215. The bath contains an aqueous solution comprising a salt of at least one ion selected from $Li^+$, $Na^+$, $K^+$, $Mg^{2+}$ or $Ca^{2+}$, such as $Ca^{2+}$. In the bath, at least one of the passive guide rollers 217*a*-*d* is arranged as a first electrode 205 being a platinum electrode. In the example shown in the illustration, there is arranged a set of counter-electrodes 221*a*-*d*.

During the time a portion of the copper based sheet 203 coated with carbonaceous material 201 is in the bath 215, a first voltage between the copper-based sheet 203 and the first electrode 205 is applied, such that the at least one ion is intercalated into the carbonaceous material 203. Also during the time a portion of the copper based sheet 203 coated with carbonaceous material 201 is in the bath 215, a second voltage, reversed as compared to the first voltage, is applied between the copper-based sheet 203 and the first electrode 205, such that graphene and/or graphene oxide is exfoliated from the carbonaceous material 203.

The first and second voltages are applied by a voltage controlling means 223, such as a potentiostat. The voltage controlling means 223 is configured to apply a first voltage in the range of range of −8 V to −2 V, such as in the range of −6 V to −2 V, and a second voltage in the range +2 V to 12 V, such as in the range +2V to +8 V, such as in the range +2 V to +6 V.

The first voltage may be applied for a period of at least 0.5 seconds, such as for a period of at least 1 second such as for a period of 1 second to 5 seconds.

The second voltage may be applied for a period less than 0.15 seconds, such as of less than 0.1 seconds. Preferably, the second voltage is applied for a shorter time than the first voltage in order not to risk oxidation of the copper.

The bath 215 is further provided with a liquid outlet 225 having a valve 225*a*. The liquid outlet is preferably in liquid connection with a filter 227 via a pump 230, such that the aqueous solution can be filtered in a filter 229 to separate the graphene and/or graphene oxide from the aqueous solution. After the graphene has been removed, the aqueous solution may comprise carbonaceous debris and copper ions. It is contemplated that a minor part of the copper-based sheet 203 has been oxidized to copper ions now present in the aqueous solution during the application of the first and second current.

After the exfoliation, the copper based sheet 203 may be subjected to cleaning to remove carbonaceous debris from its surface. The cleaning may be performed using sonification means (not shown).

The cleaned copper based sheet 203 may be fed into a container 250 comprising an electrode 245, the aqueous solution and the copper ions. The copper based sheet is the subjected to a negative potential 240 capable of reducing the copper ions on the copper surface. This way, a method and system which provides for minimal consumption of the copper substrate is be obtained.

Figure 3A:
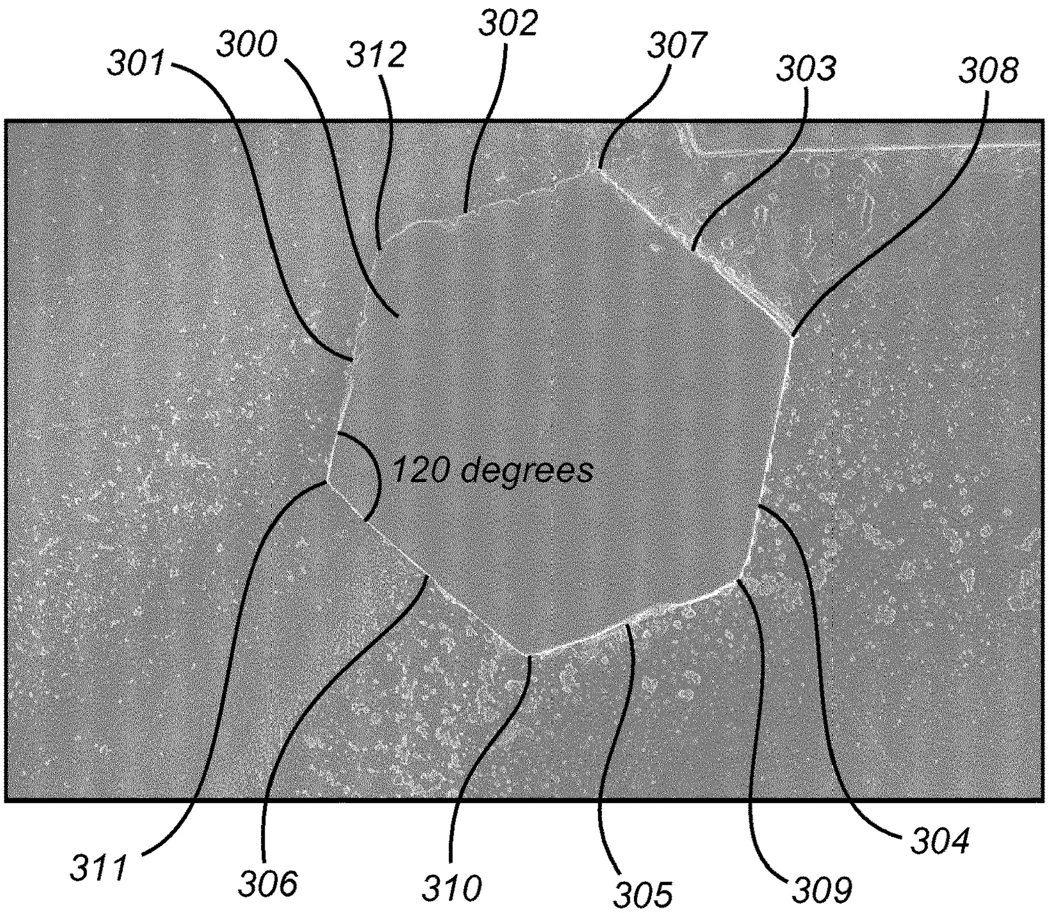
FIG. 3*a* is a scanning electron micrograph of a hexagonal carbon flake according to the invention.

FIG. 3*a* shows an annotated scanning electron micrograph of a hexagonal graphene flake according to the invention. The graphene flake 300 has an area defined by six connected line segments 301-306, wherein adjoining line segments are connected at six vertices 307-312, and wherein the internal angle at each vertex is in the range of 110°-130°, such as of approximately 120°. It is contemplated that the hexagonal shape is indicative of a highly crystalline and pure graphene. The flake is self-supporting in the sense that it is not provided on a substrate. Instead, it can support its own weight.

Figure 3B:
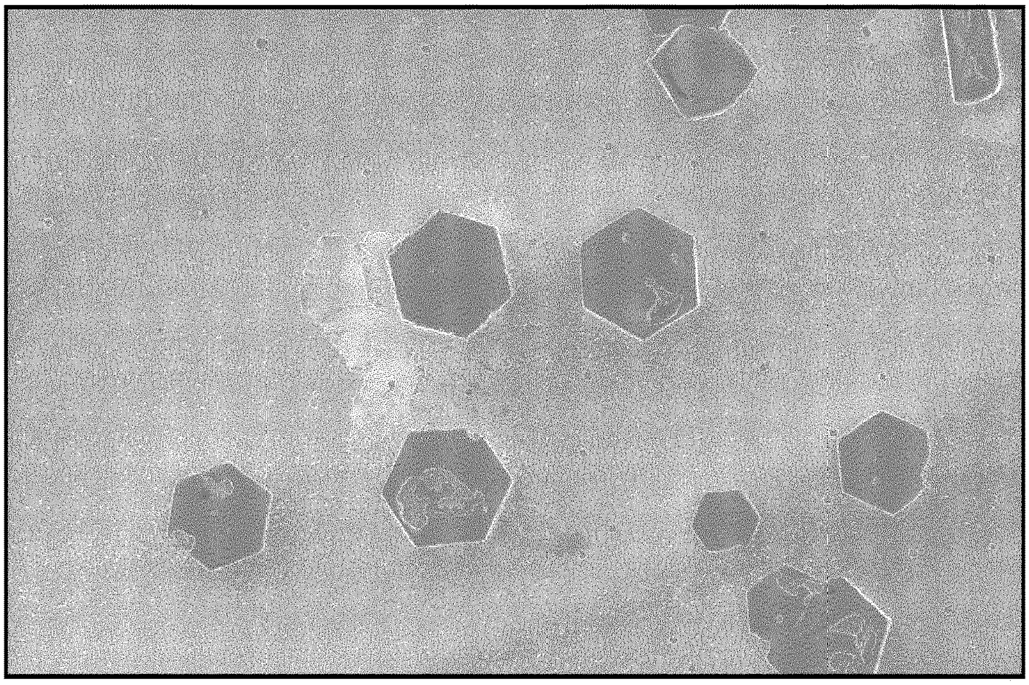
FIG. 3*b* is a scanning electron micrograph of several hexagonal carbon flakes according to the invention.

FIG. 3*b* shows a micrograph in lower magnification, depicting several hexagonal graphene flakes.

Figure 4:
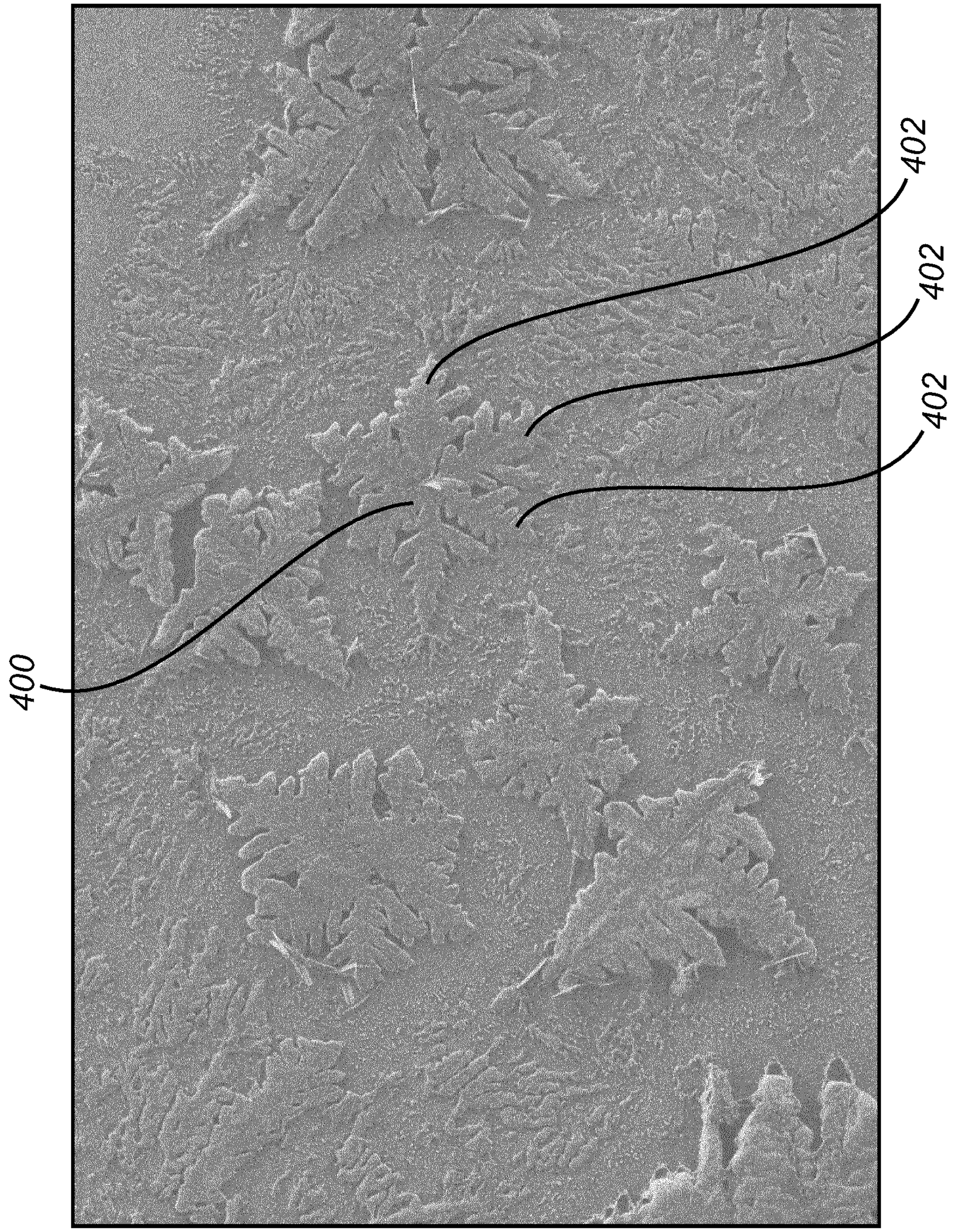
FIG. 4 is a scanning electron micrograph of a graphene flake comprising dendrites according to the invention.

FIG. 4 show an annotated scanning electron micrograph of graphene flakes comprising dendrites according to the invention. The flake 401 comprises a plurality of dendrites 402. It is contemplated that the dendritic state is a precursor state to the hexagonal shape shown in FIG. 3. The flake is self-supporting in the sense that it is not provided on a substrate. Instead, it can support its own weight.

EXAMPLES

Example 1

A carbon based composite material was prepared according to the following. 0.5 grams of soft wood lignin form the Lignoboost process known to a person skilled in the art was provided to a beaker along with 0.4 grams of deionized water, 0.05 g of poly(vinyl alcohol) (PVA) solution (10 mol-% PVA in water) and 1.05 g of isopropanol to form a slurry. The slurry was thereafter transferred to a ball mill (Planetary Mill Pulverisette) where the slurry was milled using grinding balls having a diameter in the range of 0.6-0.8 mm, in an amount of approximately two times the weight of the slurry. The slurry was milled in a scheme of 5×30 minutes, with a rest period of 15 minutes between each milling repetition. The milled slurry was thereafter collected from the mill using 60 ml a 1:1 solution of isopropanol and water. After milling, the milled slurry was treated in an ultrasonic bath. The milled slurry was electrocoated on a copper based sheet in the form of a copper roll in a continuous roll-to-roll system, in the same concentration as milled to obtain a layer of slurry which substantially covered both sides of the copper substrate sheet. The slurry was then allowed to dry on the copper surface for approximately 30 minutes.

The slurry deposited copper sheet was then heated in a tubular oven at a reaction temperature of approximately 805° C. in an inert atmosphere. The inert atmosphere was formed by purging the oven with argon gas. The slurry deposited copper surface was then subjected to the reaction temperature for ca 30 min. A hydrogen gas flow in the oven was 500 cc/min. After 30 minutes of heating, the oven was purged with argon gas. After this treatment, an intermediate product which comprised a carbon based composite material comprising a graphene film arranged on amorphous carbon was provided on the copper substrate sheet.

The copper roll was then provided between a first active roller and a second active roller and rolled through a bath containing an aqueous solution with a concentration of $CaCl_2$) of about 0.004 M. In the bath, there was provided four guide rollers. The guide rollers were provided as platinum electrodes. The copper based sheet was rolled on the platinum electrodes through the bath. In the bath, there was provided 4 counter electrodes. The platinum electrodes and the counter electrodes were connected to a potentiostat running with a galvanostatic pulse sequence. A first voltage of −4 V was applied by the potentiostat between the copper substrate sheet and the platinum electrodes. This caused $Ca^{2+}$ ions from the aqueous solution to intercalate between the graphene film and the amorphous carbon. A second voltage of +4 V with reversed voltage compared to the first voltage was then applied between the copper substrate sheet and the platinum electrodes. The second voltage pulled graphene and/or graphene oxide from the carbon based composite material as the intercalated ions travels towards the platinum electrode. The first and second voltages were pulsed in an alternating manner, with each period of the first voltage being about 1.1 seconds, and each time period of the second voltage being of about 0.1 seconds. Graphene flakes were removed into the aqueous solution with minimal copper consumption.

The aqueous solution was then drained from the bath and through a filter press in which graphene and graphene oxide flakes were separated from the aqueous solution.

The copper surface sheet was then fed through a sonication bath and subsequently into a bath containing the aqueous solution and an electrode. A reduction was performed in the bath to reduce copper ions oxidized during the application of the first and second voltage back onto the copper sheet substrate.

The obtained graphene and graphene oxide were studied in a scanning electron microscope. As is shown in FIGS. 3*a-b*, graphene flakes formed as crystalline, self-supporting hexagonal flakes having an average size of at least 1 $\mu m^2$ was obtained. As shown in FIG. 4 crystalline, self-supporting flakes having an average size of at least 1 $\mu m^2$, the flakes having a plurality of crystal dendrites was obtained.

Example 2

A carbon based composite material was prepared according to the following. 0.5 grams of a bio-oil was electrocoated on a copper based sheet in the form of a copper roll in a continuous roll-to-roll system, to obtain a layer of bio-oil which substantially covered both sides of the copper substrate sheet.

Figure 5:
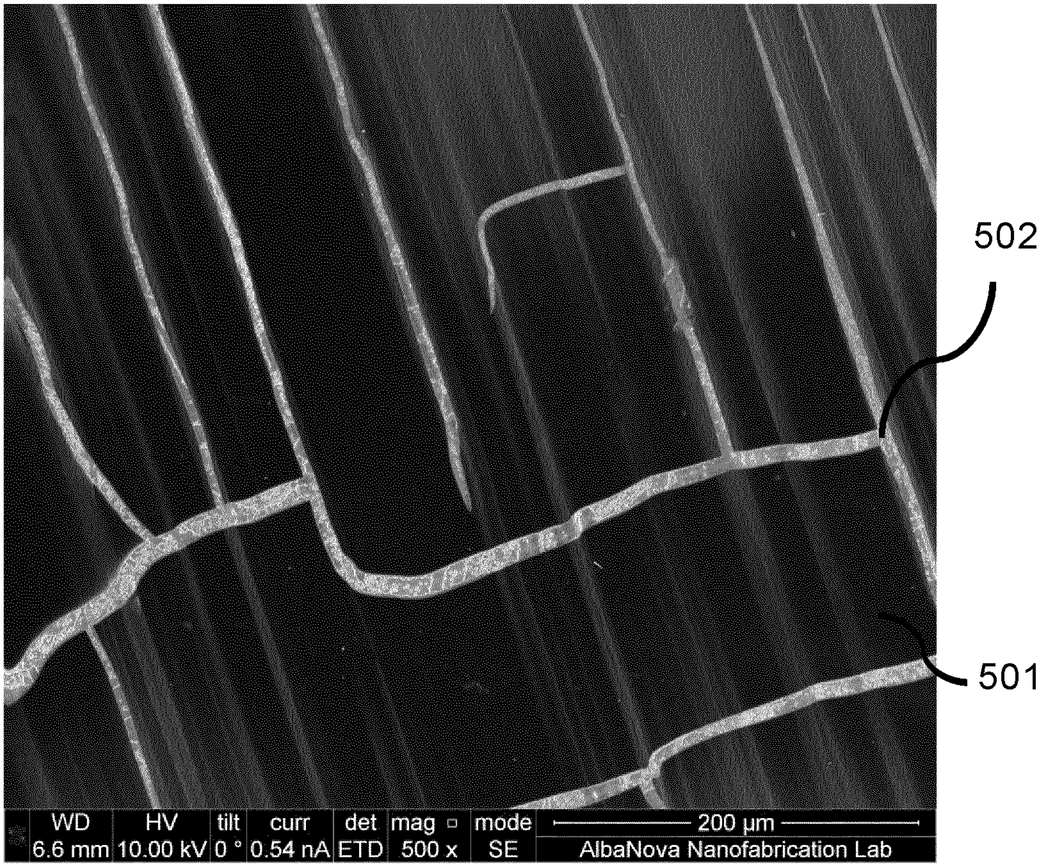
FIG. 5 is a scanning electron micrograph of carbonised bio-oil on a copper plate.

The bio-oil deposited copper sheet was then heated in a tubular oven at a reaction temperature of approximately 820° C. in an inert atmosphere. The inert atmosphere was formed by purging the oven with argon gas. The bio-oil copper surface was then subjected to the reaction temperature for ca 30 min. A hydrogen gas flow in the oven was 350 cc/min. After 40 minutes of heating, the oven was purged with argon gas. After this treatment, an intermediate product which comprised a carbon based composite material comprising a graphene film arranged on graphite was provided on the copper substrate sheet. The results were confirmed using scanning electron microscopy. FIG. 5 is a scanning electron micrograph showing the carbon based composite material 501 on the copper substrate sheet 502.

The copper roll was then provided between a first active roller and a second active roller and rolled through a bath containing an aqueous solution with a concentration of $K_2SO_4$ of about 0.001 M. In the bath, there was provided four guide rollers. The guide rollers were provided as platinum electrodes. The copper based sheet was rolled on the platinum electrodes through the bath. In the bath, there was provided 4 counter electrodes. The platinum electrodes and the counter electrodes were connected to a potentiostat running with a galvanostatic pulse sequence. A first voltage of −10 V was applied by the potentiostat between the copper substrate sheet and the platinum electrodes. This caused $K^+$ ions from the aqueous solution to intercalate between the graphene film and the graphite, and/or into the graphite. A second voltage of +2 V with reversed voltage compared to the first voltage was then applied between the copper substate sheet and the platinum electrodes. The second voltage pulled graphene and/or graphene oxide from the carbon based composite material as the intercalated ions travels towards the platinum electrode. The first and second voltages were pulsed in an alternating manner, with each period of the first voltage being about 1.1 seconds, and each time period of the second voltage being of about 0.1 seconds. Graphene flakes were removed into the aqueous solution with minimal copper consumption.

The aqueous solution was then drained from the bath and through a filter press in which graphene and graphene oxide flakes were separated from the aqueous solution.

The copper surface sheet was then fed through a sonication bath and subsequently into a bath containing the aqueous solution and an electrode. A reduction was performed in the bath to reduce copper ions oxidized during the application of the first and second voltage back onto the copper sheet substrate.

Figure 6A:
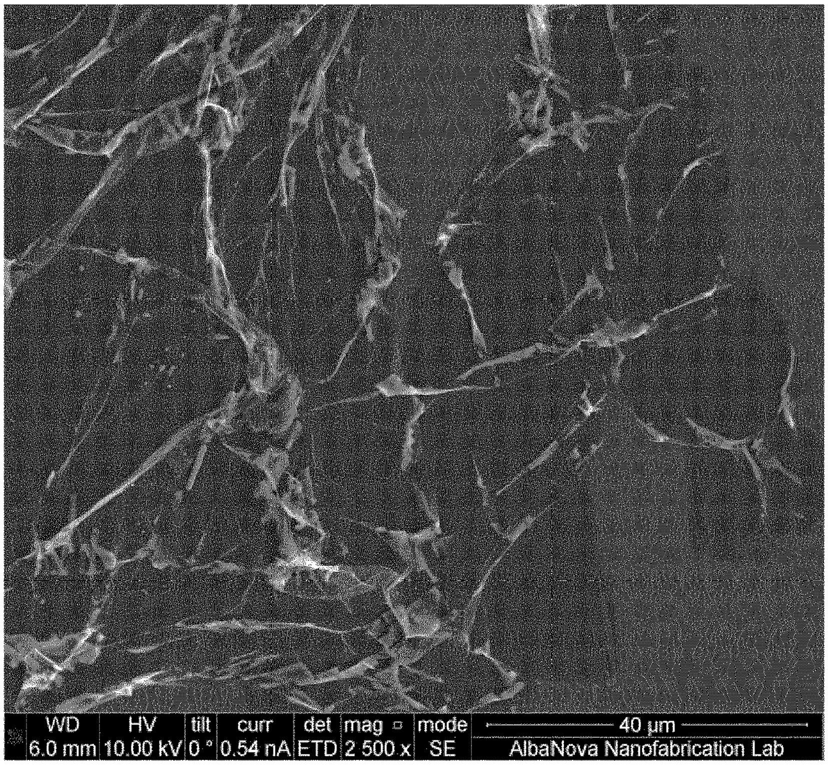
FIG. 6*a*-*b* are scanning electron micrographs of graphene flakes in different magnification.
Figure 6B:
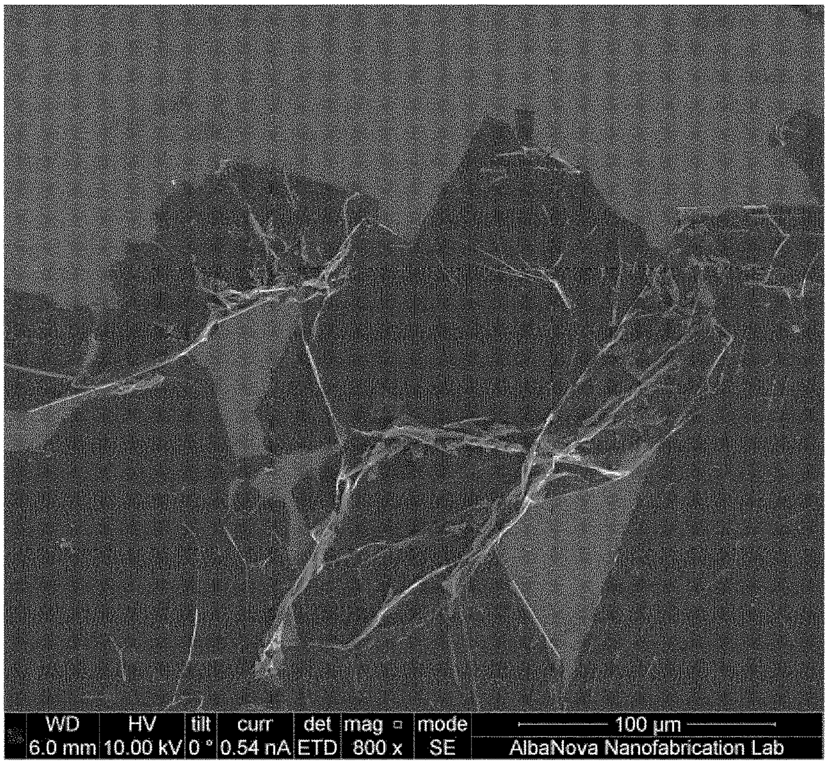

The obtained graphene and graphene oxide were studied in a scanning electron microscope. Using scanning electron microscopy, it was confirmed that graphene flakes were formed, see FIGS. 6*a-b*. FIGS. 6*a-b* are scanning electron micrographs showing the formed graphene flakes positioned on a $SiO_2$ plate.

As exemplified by examples 1 and 2, it has been realised that the inventive concept pertaining to graphene separation can be performed using any carbonaceous material.

Additionally, variations to the disclosed embodiments and examples can be understood and effected by the skilled person in practicing the claimed invention, from a study of the drawings, the disclosure, and the appended claims. In the claims, the word “comprising” does not exclude other elements or steps, and the indefinite article “a” or “an” does not exclude a plurality. The mere fact that certain measures are recited in mutually different dependent claims does not indicate that a combination of these measured cannot be used to advantage.

What is claimed is:

1. A method of producing graphene and/or graphene oxide comprising the steps of:

providing a copper-based sheet coated on at least one side with a carbonaceous material;

providing a bath comprising an aqueous solution comprising a salt of at least one ion selected from $Li^+$, $Na^+$, $K^+$, $Mg^{2+}$ or $Ca^{2+}$, in which bath a first electrode is arranged;

feeding the copper-based sheet into the bath;

applying a first voltage between the copper-based sheet and the first electrode, such that the at least one ion is intercalated into the carbonaceous material;

applying a second voltage, reversed as compared to the first voltage, between the copper-based sheet and the first electrode, such that the graphene and/or graphene oxide is exfoliated from the carbonaceous material.

2. The method of producing the graphene and/or graphene oxide according to claim 1, wherein the copper-based sheet is fed into the bath by a feeding device comprising a plurality of rollers.

3. The method of producing the graphene and/or graphene oxide according to claim 2, wherein the first electrode is arranged as a roller in the plurality of rollers.

4. The method of producing the graphene and/or graphene oxide according to claim 1, further comprising a step of:

filtering the aqueous solution to collect the graphene and/or graphene oxide and to provide a filtered aqueous solution comprising copper ions.

5. The method of producing the graphene and/or graphene oxide according to claim 4, further comprising a step of:

reducing the copper ions of the filtered aqueous solution on the copper-based sheet.

6. The method of producing the graphene and/or graphene oxide according to claim 1, wherein the carbonaceous material comprises a graphene film arranged on an amorphous carbon substrate.

7. The method of producing the graphene and/or graphene oxide according to claim 1, wherein the carbonaceous material comprises graphite.

8. The method of producing the graphene and/or graphene oxide according to claim 1, wherein the salt comprises $Na^+$ or $Ca^{2+}$.

9. The method according to claim 1, wherein the graphene and/or graphene oxide exfoliated from the carbonaceous material comprises crystalline, self-supporting hexagonal graphene flakes having an average size of at least 1 $\mu m^2$ and/or wherein the graphene and/or graphene oxide exfoliated from the carbonaceous material comprises crystalline, self-supporting graphene flakes having an average size of at least 1 $\mu m^2$, the flakes having a plurality of dendrites.

10. A system for producing graphene and/or graphene oxide comprising:

a copper-based sheet coated on one side with a carbonaceous material;

a bath comprising an aqueous solution comprising a salt of at least one ion selected from $Li^+$, $Na^+$, $K^+$, $Mg^{2+}$ or $Ca^{2+}$;

a feeding device for feeding the copper-based sheet into the bath;

a first electrode configured to be arranged in the bath;

a voltage controlling means configured to apply a first and a second voltage between the copper-based sheet and the first electrode, wherein the second voltage is reversed as compared to the first voltage.

11. The system for producing the graphene and/or graphene oxide according to claim 10, wherein the feeding device comprises at least one powered roller configured to feed the copper-based sheet and at least one passive roller configured to guide the copper-based sheet through the bath.

12. The system for producing the graphene and/or graphene oxide according to claim 11, wherein the passive roller is configured to be arranged in the bath and wherein the passive roller comprises the first electrode.

* * * * *